US006663997B2

(12) United States Patent
Dong et al.

(10) Patent No.: US 6,663,997 B2
(45) Date of Patent: Dec. 16, 2003

(54) OXIDANT FLOW FIELD FOR SOLID POLYMER ELECTROLYTE FUEL CELL

(75) Inventors: Zuomin Dong, Victoria (CA); Ken W. Kratschmar, Victoria (CA); Dongming Lu, London (CA); Ryan N. Mackie, Vancouver (CA); Walter R. Merida Donis, Victoria (CA); Michael E. Pastula, Duncan (CA); Martin L. Perry, Calgary (CA); Gaofeng Gary Wang, Winnipeg (CA); Rong Zheng, Victoria (CA)

(73) Assignee: Ballard Power Systems Inc., Burnaby (CA)

( * ) Notice: Subject to any disclaimer, the term of this patent is extended or adjusted under 35 U.S.C. 154(b) by 164 days.

(21) Appl. No.: 09/749,495

(22) Filed: Dec. 22, 2000

(65) Prior Publication Data

US 2002/0119360 A1 Aug. 29, 2002

(51) Int. Cl.[7] .................................................. H01M 2/14
(52) U.S. Cl. .......................... 429/39; 429/32; 429/34; 429/38
(58) Field of Search ............................ 429/32, 34, 38, 429/39

(56) References Cited

U.S. PATENT DOCUMENTS 5,108,849 A  4/1992  Watkins et al. ............... 429/30
5,230,966 A  7/1993  Voss et al. ..................... 429/26
6,232,008 B1 *  5/2001  Wozniczka et al. ........... 429/32

FOREIGN PATENT DOCUMENTS

| EP | 0 225 769 | 10/1990 | |
|----|-----------|---------|---|
| EP | 0 442 742 | 5/1995 | |
| EP | 0 584 107 | 7/1995 | |
| GB | 2336712 | 10/1999 | |
| GB | 2336937 | 11/1999 | |
| JP | 57-208077 | 12/1982 | |
| JP | 59-276063 | 7/1986 | |
| JP | 62-040169 | 2/1987 | |
| JP | 63-190255 | 8/1988 | |
| JP | 62-297616 | 6/1989 | |
| JP | 2-129858 | * 5/1990 | ............ H01M/8/02 |
| JP | 63-284471 | 5/1990 | |
| JP | 8-185873 | 7/1996 | |
| JP | 9-82344 | 3/1997 | |
| JP | 10-326624 | 12/1998 | |
| WO | WO 96/37005 | 11/1996 | |
| WO | WO 99/57781 | 11/1999 | |

* cited by examiner

Primary Examiner—Carol Chaney
Assistant Examiner—Dah-Wei Yuan
(74) Attorney, Agent, or Firm—McAndrews, Held & Malloy, Ltd.

(57) ABSTRACT

In solid polymer electrolyte fuel cells, a laminar flow of a dilute oxidant stream, for example air, may be disrupted by incorporating obstacles in the channels of an oxidant flow field. The laminar flow is changed to turbulent flow thereby enhancing the flow of oxygen to the membrane electrode assembly in the fuel cell and improving fuel cell performance.

15 Claims, 4 Drawing Sheets

OXIDANT FLOW FIELD FOR SOLID POLYMER ELECTROLYTE FUEL CELL

FIELD OF THE INVENTION

The present invention relates to solid polymer electrolyte fuel cells and in particular, to an improved flow path in an oxidant flow channel of the fuel cell.

BACKGROUND OF THE INVENTION

A fuel cell generates electricity from an electrochemical reaction between a fuel and an oxidant. The primary components of a fuel cell are an electrolyte sandwiched by a pair of electrodes, namely an anode and cathode, fuel delivery means to the anode, and oxidant delivery means to the cathode. An example of such a fuel cell is a solid polymer electrolyte membrane (PEM) type fuel cell that generates electricity using hydrogen as a fuel and oxygen as an oxidant. A PEM fuel cell includes a membrane electrode assembly (MEA) comprising two gas diffusion electrodes (GDE) and a solid polymer ion-exchange membrane electrolyte in between the electrodes. The membrane material permits the transmission through the membrane of hydrogen ions, but is substantially impervious to the passage of hydrogen or oxygen molecules. Each of the electrodes is coated on one side with a thin catalyst layer. Sandwiching the MEA are a pair of fluid flow field separator plates. Typically, hydrogen fuel is supplied to the anode through one or more fuel flow paths formed between a fuel flow field separator plate and the anode side of the MEA layer; oxidant is supplied to the cathode through one or more air flow paths formed between an air flow field separator plate and the cathode side of the MEA layer. A coolant plate circulating cooling fluid may be positioned adjacent to one or both flow field separator plates to remove heat generated as a byproduct of the electrochemical reaction. Alternatively, cooling channels may be incorporated into the body of one or more flow field plates.

In each fuel cell, hydrogen fuel is oxidized to generate into free electrons and protons (that is, hydrogen ions) in the presence of the catalyst at the anode. The electrons are conducted through a circuit, creating a current of useful electricity usable by a load connected to the circuit. The hydrogen protons migrate through the membrane electrolyte to the cathode. At the cathode, oxygen from the air, electrons from the circuit, and the protons combine to complete the electrochemical reaction, forming water and heat as byproducts. Multiple fuel cells may be stacked together to multiply the amount of electricity generated during operation.

Fuel and oxidant are transmitted through the flow field plates through one or more respective fuel and oxidant flow channels between the MEA layer and the respective fuel or air flow field plate. In typical conventional fuel cells, at least one open-faced channel is formed on a major surface of the flow field plate, typically by machining, moulding or printing. The open channel has a floor at the bottom of the channel and side walls; these surfaces are typically smooth, but may have some minor surface irregularities. The top open face of the channel is covered by the MEA layer when the fuel cell is assembled, thereby enclosing the channel and enabling fluid to flow therethrough. The channels are typically of rectangular shape in cross-section, and extend across the flow field plate in a variety of configurations, such as straight parallel pathways or, one or more serpentine pathways. Each end of each channel is connected to a fluid supply inlet and fluid discharge outlet of the separator plate, respectively, and reactant fluid may be fed in and out of the flow field plate by external or internal manifolding.

Conventional flow field plates are typically made by machining a suitable electrically conductive material, such as graphite. Manufacturing flow field plates out of graphite is desirable as graphite is suitably rigid, gas-impermeable, chemically inert, and relatively inexpensive. Alternatively, flow field plates may be manufactured by a screen printing technique that deposits liquid-formable layers of ink onto a substrate, as disclosed in British Patent Publication No. 2 336 712 A (British Patent Application No. 9909214.0 published Oct. 27, 1999).

Industry has recognized that one of the limiting factors to the performance of fuel cells using air as an oxidant carrier (in contrast to fuel cells using pure oxygen) is providing sufficient oxygen in the air flow channel to sustain the desired rate of the electrochemical reaction. For conventional fuel cell structures, it has been found that increasing the rate of oxygen supplied to the fuel cell relative to the supply of hydrogen will generally increase the reaction rate. Known means of increasing the oxygen supply include operating the air pumps at a setting that provides a sufficiently large concentration gradient between oxygen and hydrogen, that is, maintaining a sufficiently large air-fuel stoichiometry ratio to provide the desired reaction rate. Other known means include using filters or similar devices to extract nitrogen from the air stream prior to reaction, thereby effectively enriching the oxygen content in the air stream.

These known means tend either to be expensive, or impose a substantial load on the electrical circuit that significantly reduces the net power density producible by the fuel cell, or both.

Preferably, fuel cell system efficiency and performance are improved without substantially increasing manufacturing costs. In particular, it is desired to reduce the parasitic losses in a fuel cell system to improve performance and efficiency, either by increasing the power output producible for a given air-to-fuel stoichiometry ratio, or by decreasing the air-to-fuel stoichiometry ratio required for a given power output.

SUMMARY OF THE INVENTION

For solid polymer electrolyte membrane (PEM) fuel cells operating on dilute oxidant streams (for example, air), a significant impediment to efficient operation may be the depletion of oxygen in the layer of dilute oxidant nearest the cathode, as a consequence of laminar flow through the air flow path. The formation of an oxygen-depleted layer at the cathode imposes mass transport limitations on the electrochemical reaction, thereby limiting the electric power that can be generated by the electrochemical reaction. During fuel cell operation, oxygen tends to be extracted from the part of the oxidant stream nearest the cathode-air interface. For a substantially laminar air flow, a layer of oxygen-depleted oxidant tends to form and linger in the vicinity of the cathode-air interface during fuel cell operation. The relative scarcity of oxygen molecules near the cathode-air interface results in a relatively low oxygen concentration gradient across the electrode layer that limits the electrochemical reaction rate, and ultimately, the fuel cell performance.

An oxidant flow field plate is provided for a PEM fuel cell that has a membrane electrode assembly (MEA) layer in adjacent contiguous contact with the flow field plate so as to provide mechanical and electrical continuity. The flow field plate includes at least one open-faced oxidant flow channel formed in a major surface of the flow field plate. When the fuel cell is assembled, the open face of the oxidant flow channel is covered by the MEA layer, so that the channel forms a conduit for transmitting dilute oxidant. The oxidant flow channel or channels thus constitute an oxidant flow path for delivery of oxygen to the MEA layer. The structure so far described is conventional.

At least one obstacle for disrupting laminar flow of diluted oxidant passing through the channel is disposed in the oxidant channel. The dimensions of the obstacle and its position in the channel are selected such that when a laminar oxidant flow passing through the channel encounters the obstacle, the laminar flow pattern in the vicinity of the obstacle and especially at the MEA-oxidant interface is disrupted and changed to a turbulent flow pattern. Such disruption mixes dilute oxidant relatively lean in oxygen near the MEA-air interface with dilute oxidant relatively rich in oxygen elsewhere in the channel, effectively increasing the amount of oxygen near the MEA-oxidant interface available for electrochemical reaction. In other words, the oxygen concentration near the MEA-oxidant interface is substantially reconstituted as a result of the turbulent, twisting or otherwise non-laminar flow patterns generated by the obstacle, so as to make available at the MEA layer oxygen that, were it not for the obstacle, would have tended to pass by the MEA layer in a more remote part of the laminar flow.

The channel may be formed with opposed side walls and a floor. In one aspect of the improved oxidant flow field, the obstacle protrudes from the floor and extends between the side walls. The obstacle may be of various shapes, dimensions, and positioned in various places within the flow channel; several obstacles may be positioned in sequence to maintain turbulent flow. Each obstacle should interfere minimally with oxidant flow rate, thus implying that the longitudinal dimension (that is, the dimension in the direction of the oxidant flow) should be relatively short. Since any constriction of the flow channel negatively affects flow rate, the constriction of the flow channel created by the obstacle should be the minimum to create the desired turbulence.

A suitable obstacle is a thin slab whose plane of orientation is transverse relative to the oxidant flow direction. The laminar character of the oxidant flow striking the upstream major surface of the slab is disrupted; the diluted oxidant is forced into turbulent flow as it crosses over the exposed edge of the slab.

Alternatively, the obstacle may be positioned in the channel such that its major surface facing generally upstream is angled relative to the transverse dimension of the channel. The angling causes an oxidant stream encountering the obstacle to twist, thereby causing the oxidant stream to invert and further contributing to the mixing of the diluted oxidant stream. The optimal angle for creating a suitable twisting pattern depends on a number of parameters, including channel dimensions, obstacle dimensions, oxidant flow rate, oxidant temperature, and the like. Useful twisting patterns have been generated by obstacles positioned at angles between −65° to +65° relative to the transverse dimension of the channel.

In accordance with another aspect of the improved oxidant flow field, there is provided an obstacle having a pair of protrusions extending from the channel floor. Each protrusion has a width of about half the width of the channel, and is transversely positioned in the channel such that together, the protrusions span the width of the channel. The protrusions are longitudinally positioned offset from each other in the channel. In one embodiment, the protrusions are thin planar slabs; the slabs have their major planar surface transversely oriented; that is, they are positioned in the channel such that the major surface faces the direction of oxidant flow. Each slab is offset in the longitudinal channel direction a selected distance from the other slab in order to cause an oxidant flow encountering each slab to form a twisting and turbulent flow pattern, thereby mixing the oxidant in the channel in the vicinity of the slabs, and especially at the MEA-oxidant interface. Alternatively, either slab or both slabs may be angled relative to the oxidant flow at an angle other than 90°. In another embodiment, each protrusion is ramp-shaped, and is positioned in the channel such that one ramp faces upstream and the other ramp faces downstream, and such that the top edge of each ramp is transversely in-line with the other. This forces oxidant encountering the ramp to twist and become turbulent, thereby mixing the diluted air stream in the vicinity of the ramps, and especially at the MEA-channel interface.

In accordance with yet another aspect of the improved oxidant flow field, there is provided a helical obstacle for insertion into an oxidant flow channel. The helical obstacle is positioned in the channel such that its axis is generally parallel to the longitudinal dimension of the channel. Such an obstacle encourages oxidant flowing by the obstacle to form a twisting and turbulent pattern that mixes the dilute oxidant stream in the channel in the vicinity of the obstacle, and especially at the MEA-channel interface. For example, the helical obstacle may be a coil. The helical obstacle has a width approximately equal to the channel width, and the obstacle may be secured inside by an interference fit in the channel, adhesive or other suitable means.

The channel surface for each of the above described embodiments of the improved oxidant flow field may optionally be textured to further agitate the oxidant flowing near the channel surfaces. Such channel wall texture may be provided by a plurality of embossments and/or depressions along the channel walls.

Except for obstacles like the aforementioned helical obstacles, which are inserted into an associated channel, the obstacles are preferably integrally formed with the flow field plate by, for example, one of machining, molding or printing.

There are competing design considerations in the choice of obstacle design for a fuel cell oxidant path; an empirical approach is recommended to maximize the benefit that can be obtained by the improved oxidant flow field under different operating conditions. For example, obstacles inherently impede oxidant flow and thus lower flow rate; the contribution provided by the obstacles in promoting turbulent oxidant flow should be balanced against the necessity to maintain an adequate flow rate and acceptable pressure drop. Obstacles should not be positioned in such a way as unduly to impede access of oxidant to the MEA layer; this objective tends to limit the number of obstacles present and constrains the location and orientation of obstacles. Also, the presence of obstacles tends to add to manufacturing expense. Rough-textured oxidant channel walls may generate some localized turbulence in the oxidant flow, although rough walls per se would not be expected to be sufficient to provide a suitably well mixed oxidant stream. A design balance should be sought and achieved between these and possibly other factors.

DETAILED DESCRIPTION OF PREFERRED EMBODIMENT(S)

Figure 2:
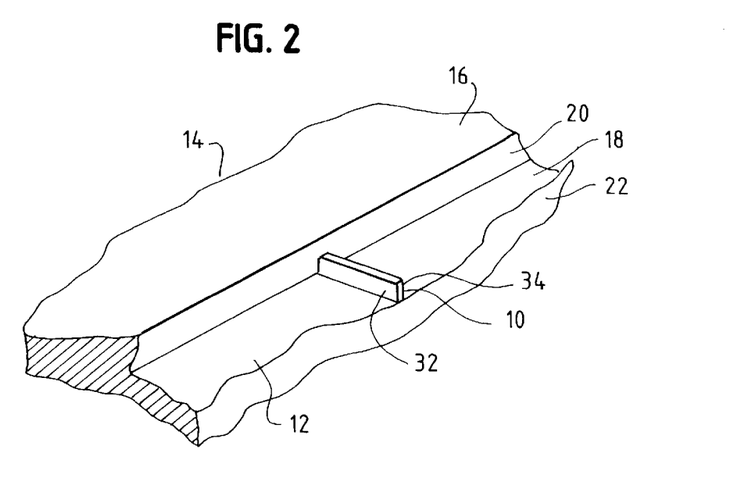
FIG. 2 is a perspective view of a portion of the flow field plate of FIG. 1, showing an oxidant flow channel with the obstacle positioned therein in accordance with a first embodiment of the improved oxidant flow field.
Figure 3:
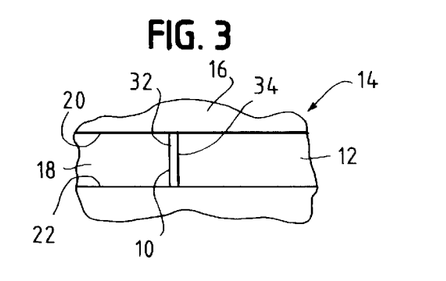
FIG. 3 is a plan view of a portion of the flow field plate illustrated in FIG. 2.
Figure 4:
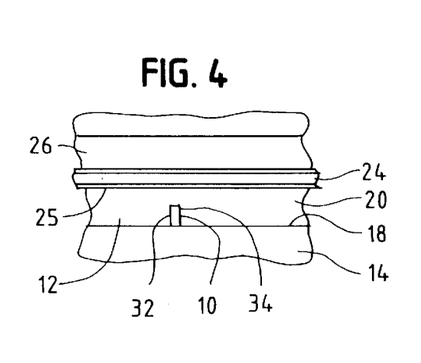
FIG. 4 is a side view of the portion of the flow field plate illustrated in FIG. 2, an adjacent MEA layer, and another flow field plate.

Referring first to FIGS. 2–4, there is illustrated an air flow obstacle 10 formed in an open air flow channel 12 of a PEM fuel cell air flow field plate 14 in accordance with a first embodiment of the improved oxidant flow field.

Obstacle 10 and channel 12 are formed in a major surface 16 of flow field plate 14 by known methods, such as by machining, moulding or screen printing. As in many conventional fuel cell flow field plates, channel 12 has a planar floor 18, and side walls 20, 22 generally perpendicular to floor 18. At each end of channel 12 are respectively, an inlet end and outlet end (not shown) respectively connecting channel 12 to an oxidant supply opening and oxidant exhaust opening (both not shown) in flow field plate 14.

Flow field plate 14 is used in PEM type fuel cells having MEA layers. While the description herein relates to PEM fuel cells supplied with air as the oxidant, the air flow obstacles or flow field plates having such air flow obstacles are also suitable for use with fuel cells supplied with other diluted oxidant streams. Referring to FIG. 4, when flow field plate 14 is assembled in a fuel cell or fuel cell stack, an MEA layer 24 covers the top open face of channel 12, thereby forming a closed conduit for transmitting air through channel 12. Preferably, sufficient compressive force is applied to establish a sealing contact between MEA layer 24 and the top edges of channel side walls 20, 22; such compressive force can be provided by conventional means used to clamp the fuel cell stack together, such as tie rods (not shown).

Figure 1:
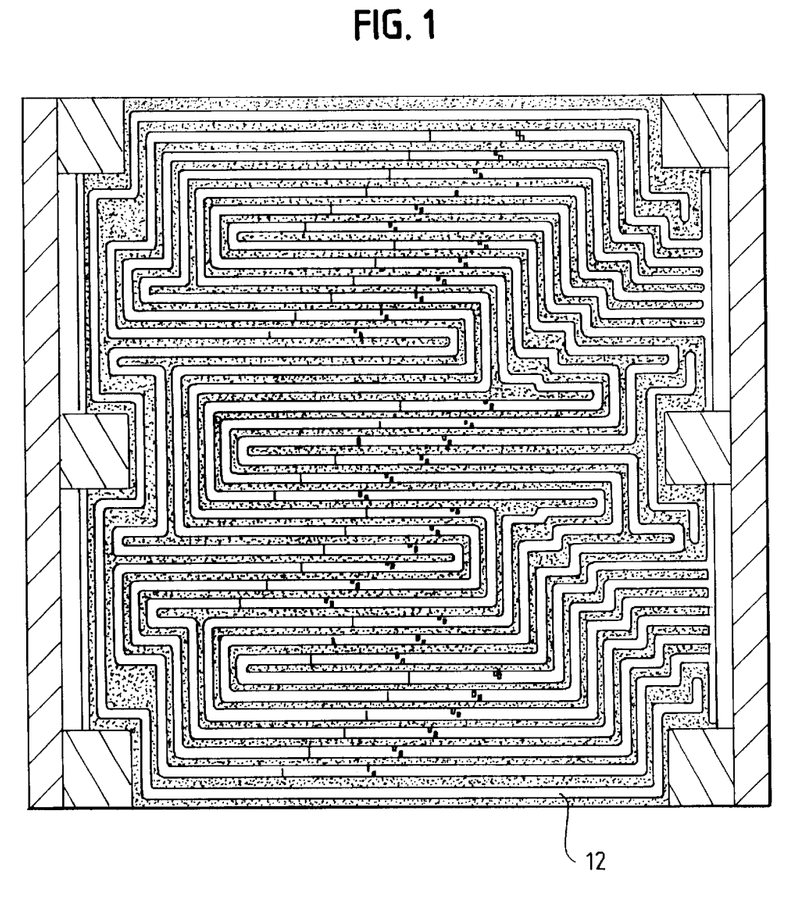
FIG. 1 is a schematic plan view of an oxidant flow field plate having a plurality of oxidant flow channels and oxidant flow obstacles.

An oxidant flow path to the MEA layer is constituted by air flowing into the fuel cell through the air supply opening, through channel 12 and out of the fuel cell through the air exhaust opening. The channel design of separator plate 14, such as the dimensions, number, and flow path configuration may be varied according to the preference of the designer, and may correspond to the channel design of conventional flow field plates, such as the BALLARD® Mark V plate. A suitable such channel design is illustrated in FIG. 1.

Referring again to FIGS. 2–4, obstacle 10 of the first embodiment of the improved oxidant flow field is a rectangular thin slab having planar major surfaces 32, 34. Obstacle 10 protrudes from channel floor 18, spans the width of channel 12, and is positioned in channel 12 such that one of major surfaces 32 faces the direction of air flow, that is, faces 32, 34 are parallel to the transverse dimension of channel 12.

Continuous operation of a fuel cell requires continuous supply of oxidant and a continuous supply of fuel. Within the length of airflow channel 12, oxygen in the air is continuously consumed by the fuel cell operation. As the electrochemical reduction occurs in the cathode, a greater proportion of oxygen in channel 12 nearer MEA layer 24 tends to be consumed in the reaction relative to oxygen more remote from MEA layer 24. If the air stream flowing through air flow channel 12 is primarily laminar, it is believed that an oxygen-depleted layer of air tends to develop and linger near MEA layer 24 that imposes mass-transportation limitations on the electrochemical reaction.

As described previously, the electrochemical reaction is between hydrogen and oxygen and produces electricity, water and heat. As air flows through channel 12, oxygen in the air passes through an oxidant gas diffusion electrode 25 of the MEA. Hydrogen fuel is passed through fuel flow channels 26 on the opposite side of MEA layer 24, that is, the anode side of the MEA layer. The electrons are stripped from the hydrogen atoms at a catalyst at the anode, travel through an external circuit (not shown) to provide electricity to a load connected to the circuit, and then travel to the cathode side of MEA layer 24. Hydrogen ions pass from fuel flow channels 26 through the hydrogen ion-permeable MEA layer 24, to the cathode, where they combine with electrons at the cathode and oxygen to complete the electrochemical reaction by forming water and heat.

A relative scarcity of oxygen molecules in the air layer nearer the MEA-air interface in comparison to relatively oxygen-rich air layers more remote from the MEA-air interface results in a relatively low oxygen concentration gradient across the oxygen electrode (cathode). This low concentration gradient inhibits the rate of the electrochemical reaction, and ultimately, reduces the operating efficiency of the fuel cell. In other words, there are concentration losses caused by a given load demanding the reactions to proceed faster than they are able. For the electrochemical reactions to occur, hydrogen and oxygen migrate through each respective gas diffusion electrode (GDE) and dissociate at their respective catalyst layers. To power the oxygen migration, there should be an oxygen concentration gradient through the cathode from the air delivery channel to the oxygen catalyst layer. As the reaction rate increases so should the slope of the concentration gradient increase. At high current densities there comes a point where the rate of reaction is limited by an oxygen concentration at the oxygen catalyst layer that is insufficient to provide the desired concentration gradient to encourage oxygen to migrate through the cathode at the rate required by the target current density. This condition is exacerbated if an oxygen-depleted layer exists at the MEA-air interface. To overcome this problem, the oxygen concentration at the MEA-air interface is reconstituted by disrupting the oxygen-depleted layer with air flow obstacles as discussed below.

A series of strategically placed and selectively dimensioned obstacles 10 serve to disrupt laminar air flowing through channel 12 and cause a local turbulent flow pattern. The obstacle dimensions are selected so that the turbulence pattern generated is sufficient to mix the oxygen-depleted layer of air near the MEA-air interface with air more remote from the MEA-air interface, say near the bottom of the channel, under typical operating conditions. In other words, the flow of oxygen to the MEA-air interface is enhanced by the turbulent air flow. Computational Fluid Dynamics (CFD) computer simulations and empirical testing of such obstacle-bearing air flow channels have demonstrated a marked increase in oxygen mass concentration near the MEA-air interface in comparison to obstacle-free channels, and a corresponding increase in fuel cell performance, especially at higher current densities.

A plurality of obstacles 10 may be spaced along a given length of channel 12; the desirable number of obstacles 10 and their spacing will depend on a number factors, such as hardware selection, obstacle dimensions, and operating conditions, and can be determined by empirical testing. For example, using a relatively tall obstacle will cause a relatively large pressure drop and a relatively significant reduction in flow rate through the channel; to maintain a suitable pressure and flow rate would thus necessitate the use of fewer such obstacles for given length. Conversely, smaller obstacles will have less of an effect on flow rate and pressure, but may be less effective in establishing turbulent flow throughout the channel; thus a higher frequency of such obstacles may be desired per channel length.

Figure 5:
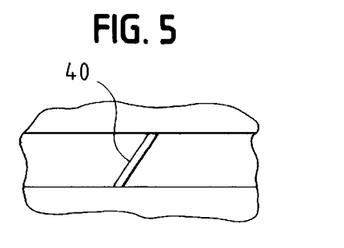
FIG. 5 is a plan view of a portion of a flow field plate having an oxidant flow channel with the oxidant flow obstacle mounted at an angle relative to the transverse direction of the channel.
Figure 6:
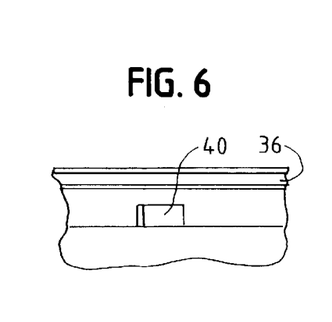
FIG. 6 is a side view of the flow field plate portion illustrated in FIG. 5 and a MEA layer.

Turbulence is generated when air flowing through channel 12 encounters an obstacle 10 and is forced over the top edge of obstacle 10, thereby causing the air stream to swirl and tumble. By angling obstacle 40 relative to the air flow as illustrated in FIGS. 5 and 6, the air stream is made to twist, in effect inverting the bottom and top layers of the air stream. Both turbulent or twisting flow patterns tend to disrupt the air flow in the vicinity of obstacle 40, and provided that the obstacle is suitably dimensioned, mixes air in the vicinity of MEA layer 36 with air remote from MEA layer 36. The oxygen concentration near the MEA layer is thus substantially reconstituted, providing oxygen at the air-MEA interface that but for the presence of the obstacle would have passed by unused in a more remote part of a laminar flow.

CFD simulations and empirical testing suggest that for typical operating conditions in a PEM type fuel cell, the minimum obstacle height should be at least 1/10 the height of the channel for the oxygen content near the MEA-air interface to be adequately reconstituted.

Empirical tests were conducted using the following equipment and under the following operating conditions:

Equipment:
  BALLARD® Mark 5 machined graphite plate (separator);
  NAFION® 117 membrane (electrolyte);
  Catalyst loading: 4 mg/cm$^2$
Operating conditions
  Pressure: 30/30 psi (207/207 kPa)
  Stoichiometry air-fuel ratio: 2/1.5
  Bladder pressure: 80 psi (552 kPa)
  Coolant & reactant gas temperatures: 75/85° C.

For testing purposes, a slot was cut into the surface of a conventional BALLARD® Mark 5 flow field plate; the slot transversely intersected several open air flow channels on the plate. A transverse strip was then inserted into the slot conforming to the original obstacle-free topography of the plate to serve as a baseline case. Various other transverse strips having obstacles of various dimensions were inserted and tested against the baseline case. It is to be understood that such transverse strips and slots were utilized to enable a variety of different sized obstacles to be conveniently tested on a single flow field plate. For commercial applications, a flow field plate having the obstacles integrally formed by machining, casting, screen printing, and the like, is preferred.

Figure 12:
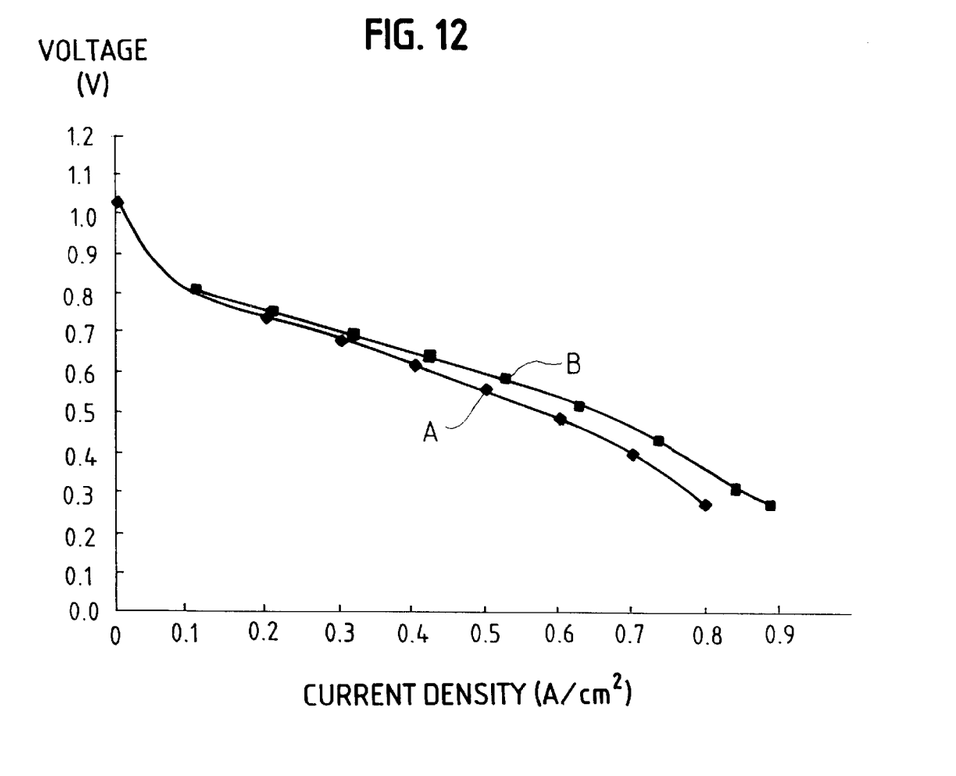
FIG. 12 is a plot of voltage as a function of operating current densities, which illustrates the voltage produced by a PEM fuel cell having obstacles in accordance with the first embodiment of the improved oxidant flow field.

An exemplary tested obstacle had a height ½ the channel height (about 0.63 mm), a width spanning the channel width, and a thickness of 1.0 mm. Test results using two such obstacles per transit are illustrated in the graph in FIG. 12 (plot B); it can be seen that there is significant increase in voltage for a given current density over the baseline case (plot A). As current density increases, the voltage improves by 23% at 0.8 A/cm$^2$.

In addition to empirical testing, CFD computer simulations were also conducted. The following Table 1 illustrates the results from a CFD simulation that calculated the steady-state oxygen concentration near the air-MEA layer interface of an air flow channel segment for various obstacles. The baseline case illustrated below represents air flowing through an obstacle-free channel. The value of the mean oxygen mass fraction and percentage change in the mass fraction indicate the effectiveness of the obstacle in increasing the oxygen concentration near the MEA-air interface. It can be seen that cases 3 and 5 provide the greatest increase in oxygen mass fraction; the obstacles in these cases have a relatively thick and tall body. The results also suggest that the angle of the obstacle in the channel has an effect on the effectiveness of the obstacle. Also, there tends to be a positive correlation between the effectiveness of the obstacle in increasing oxygen content in the MEA-air interface of the channel, and the pressure drop in the channel as a result of the obstacle.

TABLE 1

Computational Fluid Dynamic Simulation, single slab obstacle

Operating parameters:

Air pressure = 3 atm
Temperature = 80° C.
Channel dimensions:
  width = 1.5 mm
  height = 0.8 mm
  length = 50 mm
Current density (I) = 1 A/cm$^3$
Mass fraction at channel inlet ($y_{o2,in}$) = 0.218

TABLE 1-continued

Computational Fluid Dynamic Simulation,
single slab obstacle

Stoichiometry ratio at channel inlet = 2

| Case | Angle (°) | Thickness (mm) | Height (mm) | Local Mean $O_2$ mass fraction | Change in local mean $O_2$ mass fraction relative to base case | Pressure drop between channel inlet and outlet | Change in pressure drop relative to base case |
|---|---|---|---|---|---|---|---|
| base | 0 | 0 | 0 | 0.0849 | — | 4.53 | — |
| 1 | 0 | 2 | 0.3 | 0.0965 | 13.6% | 5.17 | 14.1% |
| 2 | 0 | 2 | 0.4 | 0.1043 | 22.8% | 5.83 | 28.7% |
| 3 | 0 | 2 | 0.5 | 0.1154 | 35.9% | 7.64 | 68.7% |
| 4 | 45 | 2 | 0.4 | 0.1012 | 23.6% | 6.08 | 34.2% |
| 5 | 45 | 2 | 0.5 | 0.1064 | 35.2% | 8.14 | 79.7% |
| 6 | 0 | 1 | 0.4 | 0.1059 | 25.3% | 5.35 | 18.1% |
| 7 | 45 | 1 | 0.4 | 0.101 | 24.7% | 5.43 | 19.9% |
| 8 | 65 | 1 | 0.4 | 0.102 | 18.9% | 5.61 | 23.8% |

Figure 7:
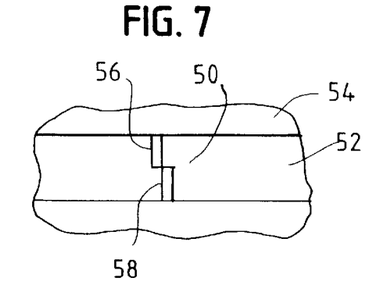
FIG. 7 is a plan view of a portion of a flow field plate having an oxidant flow channel with an oxidant flow obstacle positioned therein according to a second embodiment of the improved oxidant flow field.

FIG. 7 illustrates an air flow obstacle 50 in an air flow channel 52 of a flow field plate 54 according to a second embodiment of the improved oxidant flow field. In this embodiment, air flow obstacle 50 comprises a pair of planar slabs 56, 58 (the air flow obstacle of the second embodiment is hereinafter referred to as "offset slabs" for convenience and to distinguish from air flow obstacles of other embodiments).

Figure 8:
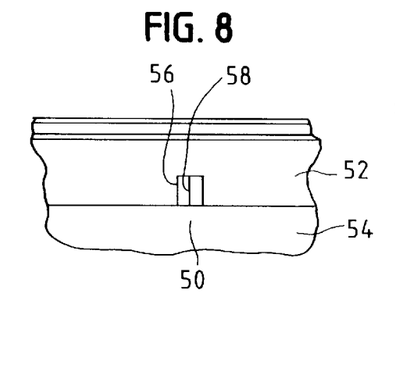
FIG. 8 is a side view of the flow field plate illustrated in FIG. 7 and a MEA layer.

Each offset slab 56, 58 of obstacle 50 has a width about ½ the channel width and a height between about 1/10 and about ½ the channel height. Offset slabs 56, 58 are positioned in channel 52 so that the major surface of each slab 56, 58 is substantially parallel to the transverse dimension of channel 52 and so that offset slabs 56, 58 span the width of channel 52. In addition, slabs 56, 58 are offset by a selected distance in the longitudinal direction of channel 52; this longitudinal offset forces air encountering offset slabs 50 to twist and become turbulent, thereby mixing the air and reconstituting the airflow near the MEA layer so that the oxygen content near the channel-MEA interface is enhanced. The twisting pattern can be altered by changing the offset distance, or, by angling slabs 56, 58 at an angle relative to the transverse dimension.

Table 2 below illustrates the results of CFD simulations for various offset slabs 50 under the following conditions:

TABLE 2

CFD Simulation,
offset slab pair obstacle

Operating parameters

Air pressure = 3 atm
Temperature = 80° C.
Channel dimensions:
  width = 1.5 mm
  height = 0.8 mm
  length = 50 mm
Current density (I) = 1 A/cm$^3$
Mass fraction at channel inlet ($y_{o2,in}$) = 0.218
Stoichiometry ratio at channel inlet = 2

| Case | Angle (°) | Thickness (mm) | Height (mm) | Local Mean $O_2$ mass fraction | Change in local mean $O_2$ mass fraction relative to base case | Pressure drop between channel inlet and outlet | Change in pressure drop relative to base case |
|---|---|---|---|---|---|---|---|
| base | 0 | 0 | 0 | 0.0849 | — | 4.53 | — |
| 1 | — | 2 | 0.4 | 0.1012 | 19.1% | 5.57 | 23.0% |
| 9 | — | 1 | 0.4 | 0.102 | 20.0% | 5.28 | 16.6% |

Figure 9:
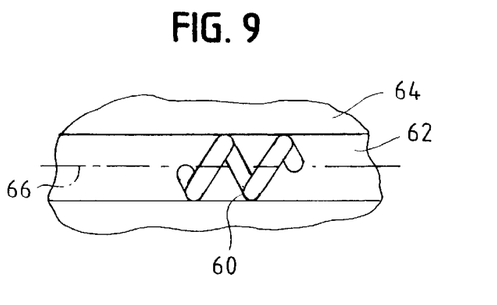
FIG. 9 is a plan view of a portion of a flow field plate having an oxidant flow channel with a helical oxidant flow obstacle mounted therein according to a third embodiment of the improved oxidant flow field.
Figure 10:
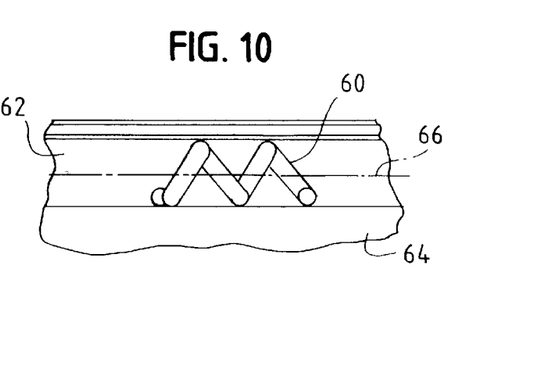
FIG. 10 is a side view of the flow field plate illustrated in FIG. 9 and a MEA layer.

FIGS. 9 and 10 illustrate a third embodiment of the improved oxidant flow field, namely a coil 60 positioned in an air flow channel 62 of an air flow field plate 64 in a manner such that air flowing through channel 62 is forced to twist and become turbulent, thereby mixing the air and reconstituting the airflow near the MEA layer so that the oxygen content near the channel-MEA interface is enhanced. More particularly, coil 60 is helical-shaped, with two coil turns, and has an axis 66 parallel to the longitudinal direction of channel 62. Coil design considerations, including coil thickness, number of coil turns, length, number of coils per length of channel, and the like, may be selected at the preference of a designer who keeps in mind considerations such as the effect of the coil on the flow rate and pressure of the air through channel 62. For example, thicker coils may require fewer coil turns to avoid causing too much pressure drop. Preferably, coil 60 is a separately manufactured discrete element that is inserted in channel 62 and affixed by an interference fit, adhesive, or other suitable conventional means.

Figure 11:
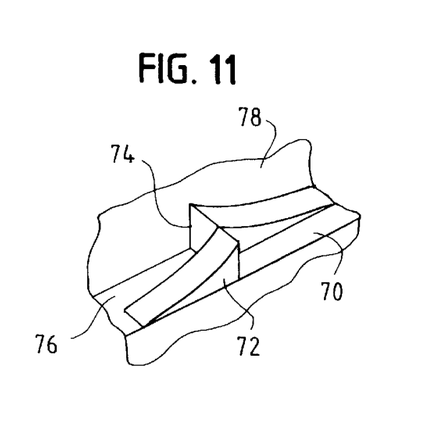
FIG. 11 is a perspective view of a flow field plate having a pair of curved ramp obstacles in accordance with a fourth embodiment of the improved oxidant flow field.

FIG. 11 illustrates a fourth embodiment of the improved oxidant flow field, namely, an obstacle 70 comprising a pair of ramps 72, 74. Ramps 72, 74 are integrally formed from a flow field plate and protrude from the floor 76 into the channel. The ramp face of each ramp 72, 74 has a width about ½ the channel width, a height between about 1/10 to about ½ the channel height, and a length that extends in the longitudinal direction of the channel. The ramps are positioned in the channel such that the top edge of each ramp 72, 74 is transversely in-line and ramps 72, 74 together span the width of the channel. Also, one of each pair of ramps 72, 74 faces upstream and downstream respectively such that in profile, the pair of ramps 72, 74 form a triangular shape. The pair of ramps 72, 74 force air flowing by to twist and become turbulent, thereby mixing the air and reconstituting the airflow near the MEA layer so that the oxygen content near the channel-MEA interface is enhanced.

Separately or in conjunction with one or more of the embodied obstacles discussed above, the channel surfaces, that is, walls 20, 22 and floor 18, may be textured to provide localized disruption of laminar air flow in the vicinity of walls 20, 22 and floor 18. For example, the channel surfaces may be formed with a plurality of spaced depressions and/or embossments (not shown), or, may have rough or irregular surfaces as a result of certain manufacturing techniques such as screen printing. While such texturing per se is likely not sufficient to cause any appreciable reconstitution of the oxygen content near the MEA-air interface, the texturing when used in combination with the discrete obstacles described above, contributes to the generation of suitably reconstituted airflow.

The improved obstacle-bearing oxidant flow fields are for use in a PEM type fuel cell. The fuel cell is preferably in a fuel cell stack (not shown) that is connectable via an anode terminal and a cathode terminal to an external load. Each fuel cell (not shown) typically comprises:

(a) an MEA layer having a porous anode electrode, a porous cathode electrode, a solid polymer electrolyte membrane layer disposed between the two electrodes, an anode electrocatalyst layer disposed between the membrane layer and the anode electrode, and a cathode electrocatalyst layer disposed between the membrane layer and the cathode electrode; and (b) two discrete associated reactant-gas impermeable flow field plates, wherein one side of one plate in conjunction with the MEA layer provides flow channels of a fuel flow field and one side of the other plate in conjunction with the MEA layer provides flow channels of a flow field for a selected dilute oxidant stream.

The MEA layer is installed in the stack between the associated flow field plates so that the side of the flow field plate that in conjunction with the MEA layer provides flow channels of a fuel flow field, faces and is in contact with the anode side of the MEA layer, whilst the side of the flow field plate providing flow channels of an oxidant flow field faces and is in contact with the cathode side of the MEA layer, so that the fuel flow channels are closed to form a conduit for supplying fuel to the MEA layer and the oxidant flow channels are closed to form a conduit for supplying oxidant to the MEA layer. The fuel cells are stacked in sequence, the anode electrode of the fuel cell at one extremity of the stack being electrically connected to the anode terminal, the cathode electrode of the fuel cell at the other extremity of the stack being electrically connected to the cathode terminal, and the anode electrode of each of the other fuel cells in the stack being electrically connected to the cathode electrode of the next adjacent fuel cell. The anode terminal and cathode terminal are electrically connected through an external load.

Some or preferably all of the fuel cells in the stack have at least one oxidant flow obstacle provided in at least one oxidant flow channel of the flow field plate of the fuel cell. The shape, dimensions and location of the obstacle are selected to enable the obstacle to cause turbulent oxidant flow near the MEA layer thereby enhancing the flow of oxygen to the cathode electrocatalyst.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. An oxidant flow field plate for a solid polymer electrolyte fuel cell, said fuel cell having a membrane electrode assembly in adjacent contiguous contact with said flow field plate, said flow field plate comprising:

(a) at least one open-faced oxidant flow channel formed on a major surface of said oxidant flow field plate, wherein the open face of said channel is covered by said membrane electrode assembly when said fuel cell is assembled, to enable a dilute oxidant stream to be directed through said channel, and (b) at least one obstacle in said channel for disrupting laminar flow of said dilute oxidant stream passing through said channel and causing turbulent flow of said oxidant stream at least in the vicinity of said obstacle, wherein said obstacle is inserted as a discrete element in said channel.

2. An oxidant flow field plate for a solid polymer electrolyte fuel cell, said fuel cell having a membrane electrode assembly in adjacent contiguous contact with said flow field plate, said flow field plate comprising:

(a) at least one open-faced oxidant flow channel formed on a major surface of said oxidant flow field plate, wherein the open face of said channel is covered by said membrane electrode assembly when said fuel cell is assembled, to enable a dilute oxidant stream to be directed through said channel, and (b) at least one obstacle in said channel for disrupting laminar flow of said dilute oxidant stream passing through said channel and causing turbulent flow of said oxidant stream at least in the vicinity of said obstacle, wherein said channel has opposed side walls and a floor, and said obstacle protrudes from said floor and extends between said side walls.

3. The oxidant flow field plate of claim 2 wherein said obstacle is a thin slab having a major surface extending in the transverse dimension of said channel.

4. The oxidant flow field plate of claim 2 wherein said obstacle is a thin slab having a major surface angled relative to the transverse dimension of said channel.

5. The oxidant flow field plate of claim 3 wherein said obstacle major surface is substantially perpendicular to said channel floor.

6. The oxidant flow field plate of claim 4 wherein said obstacle major surface is substantially perpendicular to said channel floor.

7. The oxidant flow field plate of claim 4 wherein said major surface of said obstacle is angled between −65° and +65° to the transverse dimension of said channel.

8. An oxidant flow field plate for a solid polymer electrolyte fuel cell, said fuel cell having a membrane electrode assembly in adjacent contiguous contact with said flow field plate, said flow field plate comprising:
   (a) at least one open-faced oxidant flow channel formed on a major surface of said oxidant flow field plate, wherein the open face of said channel is covered by said membrane electrode assembly when said fuel cell is assembled, to enable a dilute oxidant stream to be directed through said channel, and
   (b) at least one obstacle in said channel for disrupting laminar flow of said dilute oxidant stream passing through said channel and causing turbulent flow of said oxidant stream at least in the vicinity of said obstacle, wherein the obstacle height is at least one-tenth the channel height.

9. The oxidant flow field plate of claim 8 wherein said obstacle height does not exceed one-half said channel height.

10. An oxidant flow field plate for a solid polymer electrolyte fuel cell, said fuel cell having a membrane electrode assembly in adjacent contiguous contact with said flow field plate, said flow field plate comprising:
    (a) at least one open-faced oxidant flow channel formed on a major surface of said oxidant flow field plate, wherein the open face of said channel is covered by said membrane electrode assembly when said fuel cell is assembled, to enable a dilute oxidant stream to be directed through said channel, and
    (b) at least one obstacle in said channel for disrupting laminar flow of said dilute oxidant stream passing through said channel and causing turbulent flow of said oxidant stream at least in the vicinity of said obstacle, wherein said obstacle is integrally formed in said channel and wherein said obstacle comprises a pair of longitudinally spaced protrusions, each protrusion extending from the channel floor and having a width less than the channel width.

11. The oxidant flow field plate of claim 10 wherein each protrusion is slab-shaped and has a major surface extending in the transverse dimension of said channel.

12. The oxidant flow field plate of claim 10 wherein each protrusion is slab-shaped and is positioned in said channel such that a major surface of each protrusion is angled relative to the transverse dimension of said channel.

13. The An oxidant flow field plate for a solid polymer electrolyte fuel cell, said fuel cell having a membrane electrode assembly in adjacent contiguous contact with said flow field plate, said flow field plate comprising:
    (a) at least one open-faced oxidant flow channel formed on a major surface of said oxidant flow field plate, wherein the open face of said channel is covered by said membrane electrode assembly when said fuel cell is assembled, to enable a dilute oxidant stream to be directed through said channel, and
    (b) at least one obstacle in said channel for disrupting laminar flow of said dilute oxidant stream passing through said channel and causing turbulent flow of said oxidant stream at least in the vicinity of said obstacle, wherein said obstacle is integrally formed in said channel, wherein said obstacle comprises a pair of longitudinally spaced protrusions, each protrusion extending from the channel floor and having a width less than the channel width, and wherein each protrusion is ramp-shaped and has a ramp face extending in the longitudinal direction of said channel.

14. The oxidant flow field plate of claim 13 wherein one ramp shaped protrusion faces upstream, and one ramp-shaped protrusion faces downstream of the diluted oxidant flow in said channel.

15. An oxidant flow field plate for a solid polymer electrolyte fuel cell, said fuel cell having a membrane electrode assembly in adjacent contiguous contact with said flow field plate, said flow field plate comprising:
    (a) at least one open-faced oxidant flow channel formed on a major surface of said oxidant flow field plate, wherein the open face of said channel is covered by said membrane electrode assembly when said fuel cell is assembled, to enable a dilute oxidant stream to be directed through said channel, and
    (b) at least one obstacle in said channel for disrupting laminar flow of said dilute oxidant stream passing through said channel and causing turbulent flow of said oxidant stream at least in the vicinity of said obstacle, wherein said obstacle is helical-shaped and is positioned in said channel such that the axis of the helix is parallel to the longitudinal direction of said channel.

\* \* \* \* \*